United States Patent
Azouaoui et al.

(10) Patent No.: US 12,413,399 B2
(45) Date of Patent: Sep. 9, 2025

(54) FAULT DETECTION IN POST-QUANTUM CYPTOGRAPHY

(71) Applicant: NXP B.V., Eindhoven (NL)

(72) Inventors: Melissa Azouaoui, Norderstedt (DE);
Joppe Willem Bos, Wijgmaal (BE);
Tobias Schneider, Graz (AT); Joost Roland Renes, Eindhoven (NL); Björn Fay, Brande-Hörnerkirchen (DE)

(73) Assignee: NXP B.V., Eindhoven (NL)

(*) Notice: Subject to any disclaimer, the term of this patent is extended or adjusted under 35 U.S.C. 154(b) by 275 days.

(21) Appl. No.: 17/938,564

(22) Filed: Oct. 6, 2022

(65) Prior Publication Data

US 2024/0137214 A1   Apr. 25, 2024

(51) Int. Cl.
*H04L 9/08* (2006.01)
*G06F 17/16* (2006.01)
*H04L 9/30* (2006.01)

(52) U.S. Cl.
CPC .......... *H04L 9/0852* (2013.01); *G06F 17/16* (2013.01); *H04L 9/3093* (2013.01)

(58) Field of Classification Search
CPC ... H04L 9/0852; H04L 9/3093; H04L 9/3247; H04L 2209/08; H04L 9/004; H04L 9/002; G06F 17/16
See application file for complete search history.

(56) References Cited

U.S. PATENT DOCUMENTS 8,861,716 B2 * 10/2014 Halevi ............... H04L 9/008
  380/28
11,080,131 B2   8/2021 Schwartz
(Continued)

FOREIGN PATENT DOCUMENTS

| EP | 3304801 B1 | 8/2019 |
|---|---|---|
| JP | 2020-512712 A | 4/2020 |
| WO | 2021061833 A1 | 4/2021 |

OTHER PUBLICATIONS

Kundi et al., "Ultra High-Speed Polynomial Multiplications for Lattice-Based Cryptography on FPGAs", Jan. 2022, IEEE Transactions on Emerging Topics in Computing, vol. 10, No. 4, pp. 1993-2005 (Year: 2022).*

(Continued)

*Primary Examiner* — Kenneth W Chang

(57) ABSTRACT

Various embodiments relate to a data processing system comprising instructions embodied in a non-transitory computer readable medium, the instructions for a cryptographic operation including matrix multiplication for lattice-based cryptography in a processor, the instructions, including: applying a first function to the rows of a matrix of polynomials to generate first outputs, wherein the first function excludes the identity function; adding an additional row to the matrix of polynomials to produce a modified matrix, wherein each element in the additional row is generated by a second function applied to a column of outputs associated with each element in the additional row; multiplying the modified matrix with a vector of polynomials to produce an output vector of polynomials; applying a verification function to the output vector that produces an indication of whether a fault occurred in the multiplication of the modified matrix with the vector of polynomials; and carrying out a cryptographic operation using output vector when the verification function indicates that no fault occurred in the multiplication of the modified matrix with the vector of polynomials.

18 Claims, 4 Drawing Sheets

(56) References Cited

U.S. PATENT DOCUMENTS

| | | | | |
|---|---|---|---|---|
| 2013/0259224 A1* | 10/2013 | Lee | .................. | G06F 7/582 |
| | | | | 708/250 |
| 2018/0337899 A1* | 11/2018 | Becker | .................. | H04L 9/0825 |
| 2019/0044719 A1* | 2/2019 | Poeppelmann | ....... | H04L 9/3093 |
| 2019/0116035 A1* | 4/2019 | Mustafa | .................... | H04L 9/14 |
| 2020/0265167 A1* | 8/2020 | Banerjee | .............. | H04L 9/0631 |
| 2020/0304305 A1* | 9/2020 | Garcia Morchon | .. | H04L 9/3093 |
| 2021/0097421 A1* | 4/2021 | Dhand | .................... | G06E 3/008 |
| 2022/0353089 A1* | 11/2022 | Masny | .................. | H04L 9/3247 |

OTHER PUBLICATIONS

C. Argyrides et al., "A Fast Error Correction Technique for Matrix Multiplication Algorithms", 2009 15th IEEE International On-Line Testing Symposium (IOLTS 2009), pp. 133-137.

Shi Bai et al., Crystals-Dilithium Algorithm Specifications and Supporting Documents (Version 3.1), https://pq-crystals.org/dilithium, Feb. 8, 2021.

Leon Groot Bruinderink et al., "Differential Fault Attacks on Deterministic Lattice Signatures", IACR Transactions on Cryptographic Hardware and Embedded Systems ISSN 2569-2925, vol. 2018, No. 3, pp. 21-43.

Chong Ding et al., "Matrix Multiplication on GPUs with On-line Fault Tolerance", Ninth IEEE International Symposium on Parallel and Distributed Processing with Applications, 2011, pp. 311-317.

Thomas Espitau et al., "Loop-Abort Faults on Lattice-Based Signature Schemes and Key Exchange Protocols", May 15, 2017.

John A. Gunnels et al., "Fault-Tolerant High-Performance Matrix Multiplication: Theory and Practice", www.cs.utexas.edu/users/flame/FLARE/, Jul. 2001.

Huang et al., "Algorithm-Based Fault Tolerance for Matrix Operations", IEEE Transactions on Computers, vol. C-33, No. 6, Jun. 1984.

Jou et al., "Fault-Tolerant Matrix Arithmetic and Signal Processing on Highly Concurrent Computing Structures", Proceedings of the IEEE, vol. 74, No. 5, May 1986.

Wu et al., "Fault Tolerant Matrix-Matrix Multiplication: Correcting Soft Errors On-Line", ScalA'11, Nov. 14, 2011, Seattle, Washington, USA.

Bringer, Julien et al.; "Orthogonal Direct Sum Masking: A Smartcard Friendly Computation Paradigm in a Code, with Builtin Protection against Side-Channel and Fault Attacks"; IACR, International Association for Cryptologic Research, vol. 20140828:234222, Aug. 29, 2014; pp. 1-19.

U.S. Appl. No. 18/045,702; "Fault Countermeasures for Digital Signatures With Aborts"; Inventors: Joost Roland Renes et al.; filed Oct. 11, 2022.

U.S. Appl. No. 18/066,862; "Efficient Fault Countermeasure Through Polynomial Evaluation"; Inventors: Björn Fay et al.; filed Dec. 15, 2022.

* cited by examiner

US 12,413,399 B2

FAULT DETECTION IN POST-QUANTUM CYPTOGRAPHY

TECHNICAL FIELD

Various exemplary embodiments disclosed herein relate generally to fault detection in matrix operations of post-quantum cryptography using redundant data.

BACKGROUND

Protecting against fault attacks is essential to achieve high-assurance cryptographic implementations. In the new lattice-based post-quantum cryptography schemes one often has to multiply one public matrix with a secret vector. Introducing faults in this matrix multiplication might reveal information about the secrets used.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Further various embodiments relate to a data processing system including instructions embodied in a non-transitory computer readable medium, the instructions for a cryptographic operation including matrix multiplication for lattice-based cryptography in a processor, the instructions, including: applying a first function to the rows of a matrix of polynomials to generate first outputs, wherein the first function excludes the identity function; adding an additional row to the matrix of polynomials to produce a modified matrix, wherein each element in the additional row is generated by a second function applied to a column of outputs associated with each element in the additional row; multiplying the modified matrix with a vector of polynomials to produce an output vector of polynomials; applying a verification function to the output vector that produces an indication of whether a fault occurred in the multiplication of the modified matrix with the vector of polynomials; and carrying out a cryptographic operation using the output vector when the verification function indicates that no fault occurred in the multiplication of the modified matrix with the vector of polynomials.

Various embodiments are described, wherein the additional row is calculated as: $f_2(f_1(a_{0,i}), f_1(a_{1,i}), \ldots, f_1(a_{k-1,i}))$, where $f_1$ is the first function, $f_2$ is the second function, $a_{0,i}, a_{1,i}, \ldots, a_{k-1,i}$ are the elements of the $i^{th}$ row of the matrix of polynomials, and k is the number of rows of the matrix of polynomials.

Various embodiments are described, wherein $f_1(x)=c\cdot x$ for a constant secret c, the second function $f_2$ is a summation function, the verification function is defined as:

$f_3(w_0, w_1, \ldots, w_k) =$ $\begin{cases} \text{output a first logical value if } w_k - c\sum_{i=0}^{k-1} w_i \text{ equals zero,} \\ \text{output a second logical value otherwise.} \end{cases}$ where $w_0, w_1, \ldots, w_k$ is the output vector of polynomials.

Various embodiments are described, wherein c is a power of 2.

Various embodiments are described, wherein $f_1(x)=c^{-1}\cdot x$ for a constant secret c and $c^{-1}$ is the modular inversion of c, the second function $f_2$ is a summation function, the verification function is defined as:

$f_3(w_0, w_1, \ldots, w_k) =$ $\begin{cases} \text{output a first logical value if } c^{-1}w_k - \sum_{i=0}^{k-1} w_i \text{ equals zero,} \\ \text{output a second logical value otherwise.} \end{cases}$ where $w_0, w_1, \ldots, w_k$ is the output vector of polynomials.

Various embodiments are described, wherein $c^{-1}$ is a power of 2.

Various embodiments are described, wherein $f_1(x)=c\cdot x$ for a constant secret c selected randomly from the values $2^i$ for $0 \leq i < 16$, the second function $f_2$ is a summation function, the verification function is defined as:

$f_3(w_0, w_1, \ldots, w_k) =$ $\begin{cases} \text{output a first logical value if } w_k - c\sum_{i=0}^{k-1} w_i \text{ equals zero,} \\ \text{output a second logical value otherwise.} \end{cases}$ where $w_0, w_1, \ldots, w_k$ is the output vector of polynomials.

Various embodiments are described, wherein $f_1(x)=c_j\cdot x$ for a constant secret $c_j$ applied to each column of the matrix of polynomials, the second function $f_2$ is a summation function, the verification function is defined as:

$f_3(w_0, w_1, \ldots, w_k) =$ $\begin{cases} \text{output a first logical value if } w_k - \sum_{i=0}^{k-1} c_i \cdot w_i \text{ equals zero,} \\ \text{output a second logical value otherwise.} \end{cases}$ where $w_0, w_1, \ldots, w_k$ is the output vector of polynomials.

Various embodiments are described, wherein $c_j$ is a power of 2.

Various embodiments are described, further including: randomly shuffling the rows of a matrix of polynomials before multiplying the modified matrix with a vector of polynomials; and relabeling the output vector of polynomials based upon the random shuffling.

Various embodiments are described, further including: randomly shuffling the columns of a matrix of polynomials before multiplying the modified matrix with a vector of polynomials; and shuffling a vector of polynomials using the same random shuffling for the columns before multiplying the modified matrix with a vector of polynomials.

Further various embodiments relate to a data processing system including instructions embodied in a non-transitory computer readable medium, the instructions for a cryptographic operation including matrix multiplication for lattice-based cryptography in a processor, the instructions, including: randomly shuffling the rows of a matrix of polynomials; multiplying the randomly shuffled matrix with a vector of polynomials to produce an output vector of polynomials; relabeling the output vector of polynomials based upon the random shuffling; and carrying out a cryptographic operation using relabeled output vector.

Various embodiments are described, further including: applying a first function to the rows of a matrix of polynomials to generate first outputs before randomly shuffling the rows of a matrix of polynomials; adding an additional row to the matrix of polynomials to produce a modified matrix, wherein each element in the additional row is generated by a second function applied to a column of outputs associated with each element in the additional row before randomly shuffling the rows of a matrix of polynomials; and applying a verification function to the output vector that produces an indication of whether a fault occurred in the multiplication of the modified matrix with the vector of polynomials.

Various embodiments are described, wherein the additional row is calculated as: $f_2(f_1(a_{0,i}), f_1(a_{1,i}), \ldots, f_1(a_{k-1,i}))$, where $f_1$ is the first function, $f_2$ is the second function, $a_{0,i}, a_{1,i}, \ldots, a_{k-1,i}$ are the elements of the $i^{th}$ row of the matrix of polynomials, and k is the number of rows of the matrix of polynomials.

Further various embodiments relate to a data processing system including instructions embodied in a non-transitory computer readable medium, the instructions for a cryptographic operation including matrix multiplication for lattice-based cryptography in a processor, the instructions, including: randomly shuffling the columns of a matrix of polynomials; shuffling a vector of polynomials using the same random shuffling for the columns; multiplying the randomly shuffled matrix with the shuffled vector of polynomials to produce an output vector of polynomials; and carrying out a cryptographic operation using output vector.

Various embodiments are described, further including: applying a first function to the rows of a matrix of polynomials to generate first outputs before randomly shuffling the columns of a matrix of polynomials; adding an additional row to the matrix of polynomials to produce a modified matrix, wherein each element in the additional row is generated by a second function applied to a column of outputs associated with each element in the additional row before randomly shuffling the columns of a matrix of polynomials; and applying a verification function to the output vector that produces an indication of whether a fault occurred in the multiplication of the modified matrix with the vector of polynomials.

Various embodiments are described, wherein the additional row is calculated as: $f_2(f_1(a_{0,i}), f_1(a_{1,i}), \ldots, f_1(a_{k-1,i}))$, where $f_1$ is the first function, $f_2$ is the second function, $a_{0,i}, a_{1,i}, \ldots, a_{k-1,i}$ are the elements of the $i^{th}$ row of the matrix of polynomials, and k is the number of rows of the matrix of polynomials.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
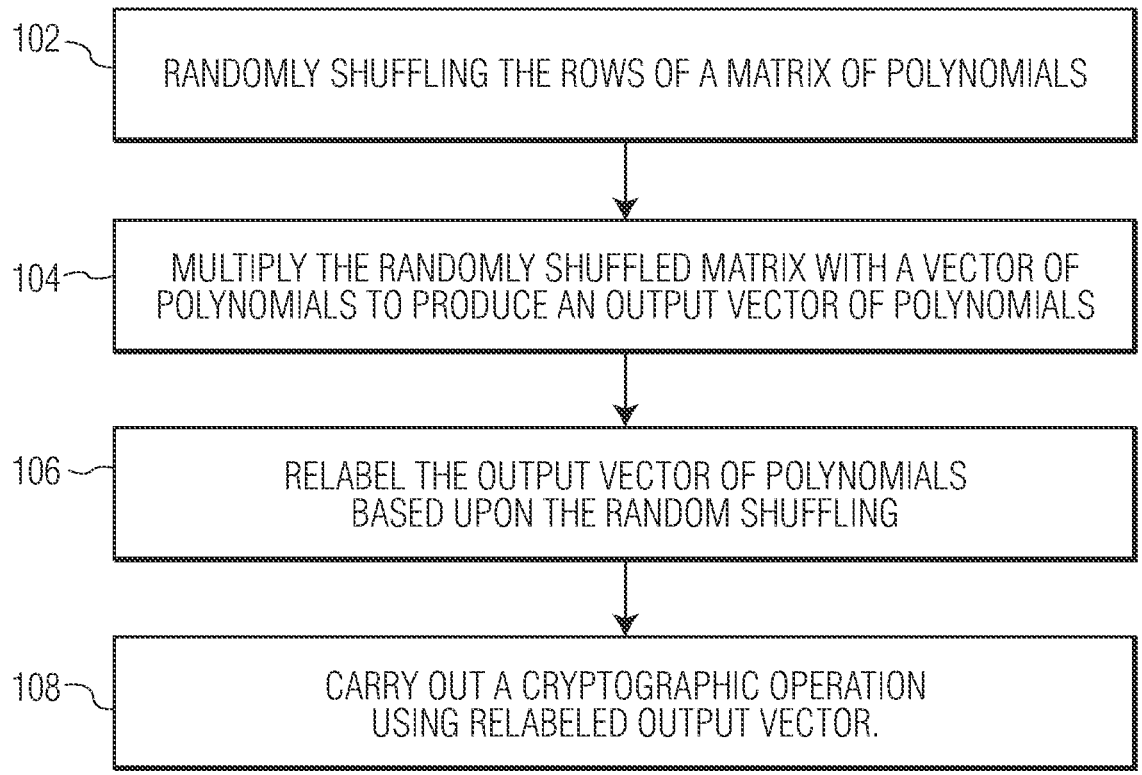
FIG. 1 illustrates a flow diagram of a method of carrying out a cryptographic operation by a processor that shuffles the rows of a polynomial matrix before a matrix multiplication.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Protecting against fault attacks is important to achieve high-assurance cryptographic implementations. In the new lattice-based post-quantum cryptography schemes one often has to multiply one public matrix with a secret vector. Introducing faults in this matrix multiplication might reveal information about the secrets used. Embodiments of fault detection will be described herein that show how to introduce additional redundant information which helps to detect such purposefully introduced faults during the computation. This matrix/vector arithmetic is a core operation in many lattice-based post-quantum cryptographic schemes. Such detection of the introduction of faults is needed because such fault attacks might result in the extraction of the private key used. The fault detection method described herein may introduce additional data (in the form of an additional row to the matrix) to the computation. The fault detection method may also shuffle either the rows or the columns of the matrix before carrying out the multiplication. This makes the computation slower but allows one to check if faults were introduced during the computation. Multiple techniques to make the computation on this redundant data more efficient are presented.

In some cryptographic schemes (such as the post-quantum digital signature scheme Dilithium) one works with elements from a polynomial ring $R_q = \mathbb{Z}_q[X]/(X^n+1)$. More specifically, in the signature generation one has a public matrix $A \in R_q^{k \times \ell}$ and a secret vector $y \in R^\ell$. These two objects are multiplied as $w = A \cdot y$ using a matrix/vector product of the individual elements that are all polynomials in the polynomial ring $R_q$.

One of the techniques to learn information about the secret values is to actively introduce faults during the computation and use this faulty outcome to learn or deduce information about the computation using the secret values. Such an attack is possible during the matrix/vector product. The fault detection method described herein is about the detection of modifications of the values in the public matrix A.

First, some notation will be defined. The elements $a_{i,j} \in R_q$ for $0 \le i < k$ and $0 \le j < \ell$ of the public matrix A are $$A = \begin{bmatrix} a_{0,0} & a_{0,1} & \cdots & a_{0,\ell-1} \\ a_{1,0} & a_{1,1} & \cdots & a_{1,\ell-1} \\ \vdots & \vdots & \ddots & \vdots \\ a_{k-1,0} & a_{k-1,1} & \cdots & a_{k-1,\ell-1} \end{bmatrix}.$$

In a similar way one can define the vector y and its elements $y_i \in R_q$ for $0 \le i < \ell$ $$y = \begin{bmatrix} y_0 \\ y_1 \\ \vdots \\ y_{\ell-1} \end{bmatrix}.$$

Then by definition the product $w = A \cdot y$ is $$w = A \cdot y = \begin{bmatrix} w_0 \\ w_1 \\ \vdots \\ w_{k-1} \end{bmatrix} = \begin{bmatrix} \sum_{i=0}^{\ell-1} a_{0,i} \cdot y_i \\ \sum_{i=0}^{\ell-1} a_{1,i} \cdot y_i \\ \vdots \\ \sum_{i=0}^{\ell-1} a_{k-1,i} \cdot y_i \end{bmatrix}.$$

In the Dilithium signature scheme, the main part of the signature z is computed as $z = y + c \cdot s_1$, with y being the previously mentioned secret vector, c is called the challenge and is a sparse polynomial derived from w, and $s_1$ is the secret signing key. For valid signatures it is computationally hard to recover $s_1$ from z because the secret vector y is generated such that it masks any information about $s_1$ in z.

The Dilithium signature scheme provides two options to generate the secret vector y. It can either be generated randomly for each signature, or deterministically derived from the hash of the message and a secret key. The first is referred to as randomized signing and the latter as deterministic signing.

Deterministic signing is in particular vulnerable to differential fault attacks. In the context of Dilithium signature generation, an adversary can trigger the signature of the same message twice and inject a fault to change the value of w. The attacker then gets two signatures $z = y + c \cdot s_1$ and $z' = y' + c' \cdot s_1$. Because the signature process is deterministic the same secret vector y is used for both signatures (y=y'). However, the value of w is faulted in the second signature and as a result the challenges for the two signatures are different (c≠c'). The adversary hence recovers a relation of the form $(z-z') = (c-c') \cdot s_1$, and since all values z, z', c and c' are public or can be derived from the public signatures, the attacker recovers information on the secret key $s_1$.

Ways to fault the value of w to mount the previous attack include injecting a random fault during the computation of the matrix vector product $w = A \cdot y$.

One countermeasure that may be used by the fault detection method is to randomize the rows of A. This may include reordering the layout of A and processing the matrix as usual (in-order) or randomizing the order in which the rows of A in the matrix/vector product computation are processed. This randomization helps because it makes inserting a targeted fault much more difficult for a potential adversary.

Define the set S as the set of integers 0 to k−1: $S = \{0, 1, \ldots, k-1\}$. Select a random permutation $\pi_1 : S \to S$ which is used to "shuffle" the rows of A in a preprocessing step. For example, the first row $a_{0,0}, a_{0,1}, \ldots, a_{0,\ell-1}$ of A is mapped to row number $\pi_1(0)$ as $a_{\pi_1(0),0}, a_{\pi_1(0),1}, \ldots, a_{\pi_1(0),\ell-1}$. The inverse permutation is denoted by $\pi_1^{-1}$ such that $\pi_1^{-1}(\pi_1(x)) = x$ as expected. This pre-processing step converts A into Â as $$\hat{A} = \begin{bmatrix} \hat{a}_{0,0} & \hat{a}_{0,1} & \cdots & \hat{a}_{0,\ell-1} \\ \hat{a}_{1,0} & \hat{a}_{1,1} & \cdots & \hat{a}_{1,\ell-1} \\ \vdots & \vdots & \ddots & \vdots \\ \hat{a}_{k-1,0} & \hat{a}_{k-1,1} & \cdots & \hat{a}_{k-1,\ell-1} \end{bmatrix} =$$

$$\begin{bmatrix} a_{\pi_1^{-1}(0),0} & a_{\pi_1^{-1}(0),1} & \cdots & a_{\pi_1^{-1}(0),\ell-1} \\ a_{\pi_1^{-1}(1),0} & a_{\pi_1^{-1}(1),1} & \cdots & a_{\pi_1^{-1}(1),\ell-1} \\ \vdots & \vdots & \ddots & \vdots \\ a_{\pi_1^{-1}(k-1),0} & a_{\pi_1^{-1}(k-1),1} & \cdots & a_{\pi_1^{-1}(k-1),\ell-1} \end{bmatrix}.$$

This randomization of the rows makes it much harder to target a specific fault in the public matrix A. The computation of $w = A \cdot y$ can be carried out as follows. First transform A into the randomized Â as above. Next, compute $$\hat{w} = \hat{A} \cdot y = \begin{bmatrix} \hat{w}_0 \\ \hat{w}_1 \\ \vdots \\ \hat{w}_{k-1} \end{bmatrix} = \begin{bmatrix} \sum_{i=0}^{\ell-1} \hat{a}_{0,i} \cdot y_i \\ \sum_{i=0}^{\ell-1} \hat{a}_{1,i} \cdot y_i \\ \vdots \\ \sum_{i=0}^{\ell-1} \hat{a}_{k-1,i} \cdot y_i \end{bmatrix} = \begin{bmatrix} \sum_{i=0}^{\ell-1} a_{\pi_1^{-1}(0),i} \cdot y_i \\ \sum_{i=0}^{\ell-1} a_{\pi_1^{-1}(1),i} \cdot y_i \\ \vdots \\ \sum_{i=0}^{\ell-1} a_{\pi_1^{-1}(k-1),i} \cdot y_i \end{bmatrix}.$$

Finally obtain the desired result w by relabeling $w_i = \hat{w}_{\pi_1^{-1}(i)}$ for $0 \le i < k$.

FIG. 1 illustrates a flow diagram of a method of carrying out a cryptographic operation by a processor that shuffles the rows of a polynomial matrix before a matrix multiplication. First the method randomly shuffles the rows of a matrix of polynomials 102. Next, the method multiplies the randomly shuffled matrix with a vector of polynomials to produce an output vector of polynomials 104. Then the method relabels the output vector of polynomials based upon the random shuffling 106. Finally, the method carries out a cryptographic operation using relabeled output vector 108. The cryptographic operation may be for example a digital signature.

Besides randomizing the rows, the columns of A may instead be shuffled, however this also means that the values of y need to be shuffled accordingly. In a similar manner to randomizing the rows, define the set T as the set of integers 0 to $\ell-1$: $T = \{0, 1, \ldots, \ell-1\}$. Select a random permutation $\pi_2 : T \to T$ which allows the "shuffling" of the columns of A in a preprocessing step by defining Ã

$$\tilde{A} = \begin{bmatrix} \tilde{a}_{0,0} & \tilde{a}_{0,1} & \cdots & \tilde{a}_{0,\ell-1} \\ \tilde{a}_{1,0} & \tilde{a}_{1,1} & \cdots & \tilde{a}_{1,\ell-1} \\ \vdots & \vdots & \ddots & \vdots \\ \tilde{a}_{k-1,0} & \tilde{a}_{k-1,1} & \cdots & \tilde{a}_{k-1,\ell-1} \end{bmatrix} =$$

-continued $$\begin{bmatrix} a_{0,\pi_2^{-1}(0)} & a_{0,\pi_2^{-1}(1)} & \cdots & a_{0,\pi_2^{-1}(\ell-1)} \\ a_{1,\pi_2^{-1}(0)} & a_{1,\pi_2^{-1}(1)} & \cdots & a_{1,\pi_2^{-1}(\ell-1)} \\ \vdots & \vdots & \ddots & \vdots \\ a_{k-1,\pi_2^{-1}(0)} & a_{k-1,\pi_2^{-1}(1)} & \cdots & a_{k-1,\pi_2^{-1}(\ell-1)} \end{bmatrix}.$$

Similarly, the vector y is also pre-processed (or alternatively, this can be done on-the-fly) by defining $\tilde{y}$ $$\tilde{y} = \begin{bmatrix} \tilde{y}_0 \\ \tilde{y}_1 \\ \vdots \\ \tilde{y}_{\ell-1} \end{bmatrix} = \begin{bmatrix} y_{\pi_2^{-1}(0)} \\ y_{\pi_2^{-1}(1)} \\ \vdots \\ y_{\pi_2^{-1}(\ell-1)} \end{bmatrix}.$$

The computation of w=A·y may be carried out as follows. First transform A into the randomized $\tilde{A}$ and y into $\tilde{y}$. Next, compute $$w = \tilde{A} \cdot \tilde{y} = \begin{bmatrix} w_0 \\ w_1 \\ \vdots \\ w_{k-1} \end{bmatrix} = \begin{bmatrix} \sum_{i=0}^{\ell-1} \tilde{a}_{0,i} \cdot \tilde{y}_i \\ \sum_{i=0}^{\ell-1} \tilde{a}_{1,i} \cdot \tilde{y}_i \\ \vdots \\ \sum_{i=0}^{\ell-1} \tilde{a}_{k-1,i} \cdot \tilde{y}_i \end{bmatrix} = \begin{bmatrix} \sum_{i=0}^{\ell-1} a_{0,\pi_2^{-1}(i)} \cdot y_{\pi_2^{-1}(i)} \\ \sum_{i=0}^{\ell-1} a_{1,\pi_2^{-1}(i)} \cdot y_{\pi_2^{-1}(i)} \\ \vdots \\ \sum_{i=0}^{\ell-1} a_{k-1,\pi_2^{-1}(i)} \cdot y_{\pi_2^{-1}(i)} \end{bmatrix}.$$

No final relabeling is needed.

Figure 2:
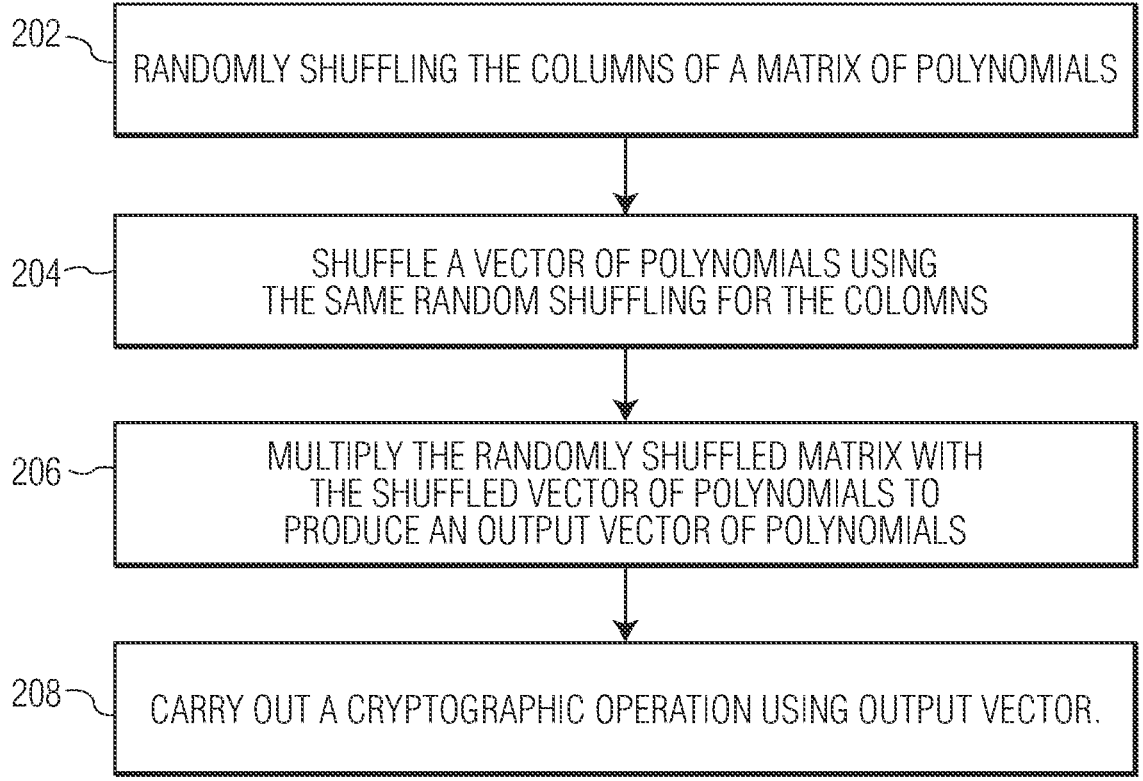
FIG. 2 illustrates a flow diagram of a method of carrying out a cryptographic operation by a processor that shuffles the columns of a polynomial matrix before a matrix multiplication.

FIG. 2 illustrates a flow diagram of a method of carrying out a cryptographic operation by a processor that shuffles the columns of a polynomial matrix before a matrix multiplication. The method begins by randomly shuffling the columns of a matrix of polynomials 202. Next the method shuffles a vector of polynomials using the same random shuffling for the columns 204. Next, the method multiplies the randomly shuffled matrix with the shuffled vector of polynomials to produce an output vector of polynomials 206. Finally, the method carries out a cryptographic operation using output vector 208.

In another fault detection approach, faults may be detected by using redundant information. The approach is to add some redundant information in the form of an additional row of values to the matrix A. This extra information may be used to verify whether faults were introduced during the matrix/vector product. This is done by defining two functions $f_1:R_q \to R_q$ (first function) and $f_2:R_q^k \to R_q$ (second function). Next, create an additional k-th row of A where each column i (for $0 \leq i < \ell$) is defined as:

$$f_2(f_1(a_{0,i}), f_1(a_{1,i}), \ldots, f_1(a_{k-1,i})).$$

This means that after multiplication with y there is an additional element in w:

$$w_k = \sum_{i=0}^{\ell-1} f_2(f_1(a_{0,i}), f_1(a_{1,i}), \ldots, f_1(a_{k-1,i})) \cdot y_i.$$

The functions $f_1$ and $f_2$ are defined in such a way that the newly computed $w_k$ may be verified using the first k values $w_0, w_1, \ldots, w_{k-1}$. This is done with a verification function $f_3:R_q^{k+1} \to \{0,1\}$ which given the k+1 vector entries of w determines if a fault was introduced during the computation ($f_3$ returns zero or one) or the verification did not detect a fault ($f_3$ returns one or zero respectively).

Some examples of functions $f_1$ and $f_2$ will now be described. In a first example, the most basic instantiation of this construction is to take $f_1$ as the identity function: $f_1(x)=x$. Define $f_2$ as the summation $$f_2(a_{0,i}, a_{1,i}, \ldots, a_{k-1,i}) = \sum_{j=0}^{k-1} a_{j,i}.$$

Next, $f_3$ may be may defined as:

$$f_3(w_0, w_1, \ldots, w_k) = \begin{cases} \text{output one if } w_k - \sum_{i=0}^{k-1} w_i \text{ equals zero,} \\ \text{output zero otherwise.} \end{cases}$$

Note that output values, one and zero, of $f_3$ may be swapped, so that one indicates no fault and zero indicates a fault. This works as intended because $w_k$ is defined as $$w_k = \sum_{i=0}^{\ell-1} f_2(a_{0,i}, a_{1,i}, \ldots, a_{k-1,i}) \cdot y_i = \sum_{i=0}^{\ell-1} \sum_{j=0}^{k-1} a_{j,i} \cdot y_i,$$

and $f_3$ indeed outputs one if this subtraction equals zero:

$$w_k - \sum_{j=0}^{k-1} w_j = w_k - \sum_{j=0}^{k-1} \sum_{i=0}^{\ell-1} a_{j,i} \cdot y_i = w_k - \sum_{i=0}^{\ell-1} \sum_{j=0}^{k-1} a_{j,i} \cdot y_i = 0.$$

In other embodiments the function $f_1$ may be defined to include all functions but the identity function.

In a second example, $f_1$ may be defined as $f_1(x)=c \cdot x$ for a constant secret value $c \in R_q$ (and define $f_2$ as the summation function). This results in an additional factor of c in each element in the additional row of A which after multiplication propagates to the final element of w. This means that $f_3$ becomes:

$$f_3(w_0, w_1, \ldots, w_k) = \begin{cases} \text{output one if } w_k - c\sum_{i=0}^{k-1} w_i \text{ equals zero,} \\ \text{output zero otherwise.} \end{cases}$$

If the element c is chosen as a power of two, then multiplications can be omitted in practice and replaced by a bit shift.

In a third example, instead of multiplying $\Sigma_{i=0}^{k-1} w_i$ with c as in the second example, $w_k$ may be multiplied by the modular inverse $c^{-1}$ mod q. This means that $f_3$ becomes:

$$f_3(w_0, w_1, \ldots, w_k) = \begin{cases} \text{output one if } c^{-1}w_k - \sum_{i=0}^{k-1} w_i \text{ equals zero,} \\ \text{output zero otherwise.} \end{cases}$$

This third example may also be optimized in practice. Moreover, for the case of the Dilithium post-quantum signature scheme, $q=8380417=2^{23}-2^{13}+1$ and this structure may be made use of. The constant c may be chosen in $f_1(x)=c \cdot x$ as a random pick of any of the sixteen values $2^i$ for $0 \le i < 16$. This multiplication is just a shift in practice and efficient to implement. Computing $c^{-1}=2^{-i}$ in $f_3$ can be done efficiently by multiplying with $$\frac{24575q+1}{2^i} \equiv 2^{-i} (\mathrm{mod}\ q).$$

This works because $(24575q+1) \equiv 0 \pmod{2^i}$ for all $0 \le i < 16$. Hence, only a single extra multiplication is needed in the computation of $f_3$.

In a fourth example, the second and third examples may be generalized by using k row-specific constants $c_j \in R_q$ for $0 \le j < k$ instead of one global constant c. This means k different functions $f_1^j$ may be used and an additional k-th row of A is constructed where each column i (for $0 \le i < \ell$) is defined as:

$$f_2(f_1^0(a_{0,i}), f_1^1(a_{1,i}), \ldots, f_1^{k-1}(a_{k-1,i})).$$

The verification function $f_3$ becomes $$f_3(w_0, w_1, \ldots, w_k) = \begin{cases} \text{output one if } w_k - \sum_{i=0}^{k-1} c_i \cdot w_i \text{ equals zero,} \\ \text{output zero otherwise.} \end{cases}$$

Figure 3:
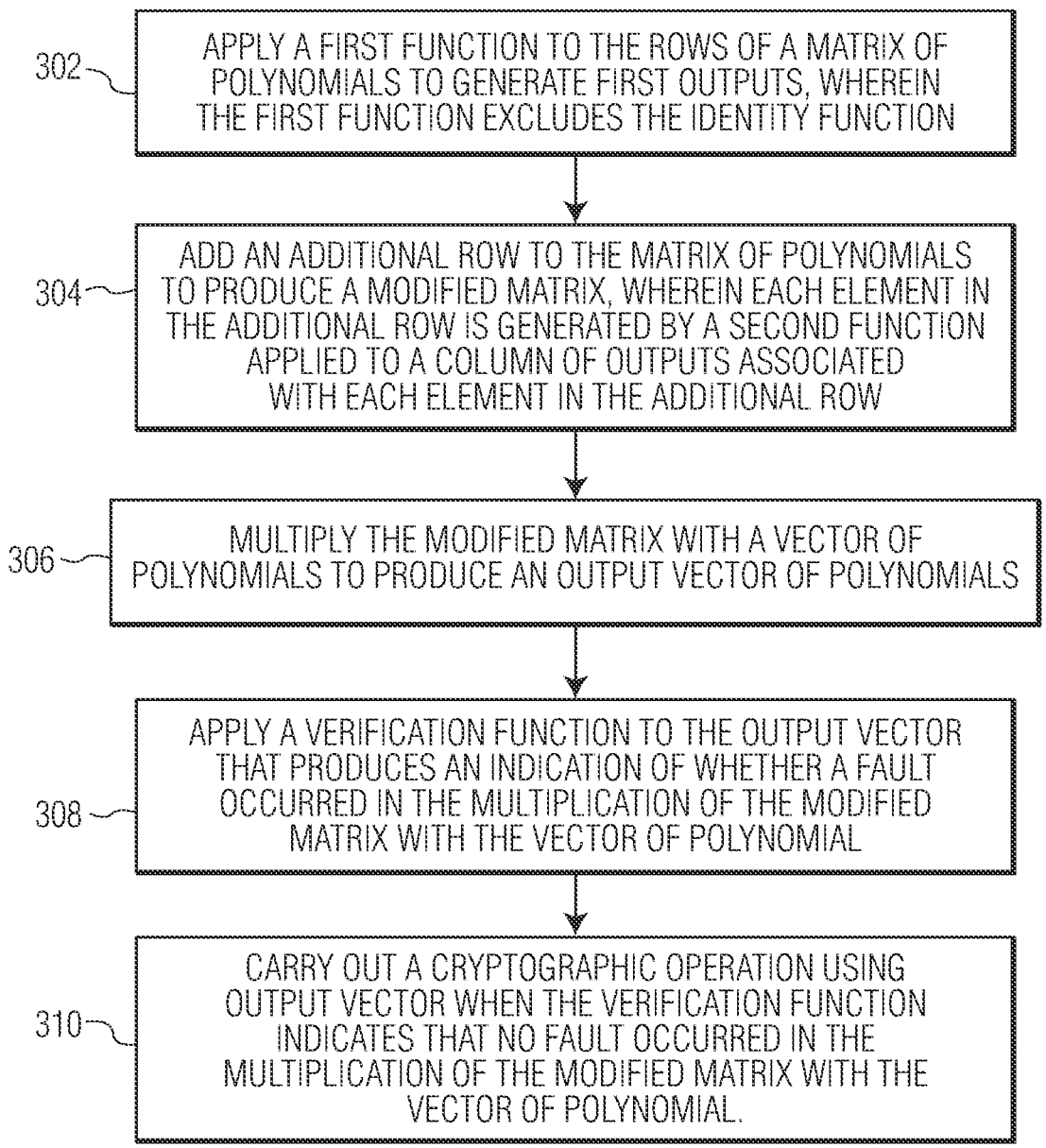
FIG. 3 illustrates a flow diagram of a method of carrying out a cryptographic operation by a processor that adds redundant information to a polynomial matrix before a matrix multiplication.

FIG. 3 illustrates a flow diagram of a method of carrying out a cryptographic operation by a processor that adds redundant information to a polynomial matrix before a matrix multiplication. The method first applies a first function to the rows of a matrix of polynomials to generate first outputs, wherein the first function excludes the identity function 302. Next the method adds an additional row to the matrix of polynomials to produce a modified matrix, wherein each element in the additional row is generated by a second function applied to a column of outputs associated with each element in the additional row 304. Then the method multiplies the modified matrix with a vector of polynomials to produce an output vector of polynomials 306. The method also applies a verification function to the output vector that produces an indication of whether a fault occurred in the multiplication of the modified matrix with the vector of polynomials 308. Finally, the method carries out a cryptographic operation using the output vector when the verification function indicates that no fault occurred in the multiplication of the modified matrix with the vector of polynomials.

Note that the methods of FIG. 1 and FIG. 2 may be combined with the method of FIG. 3.

Figure 4:
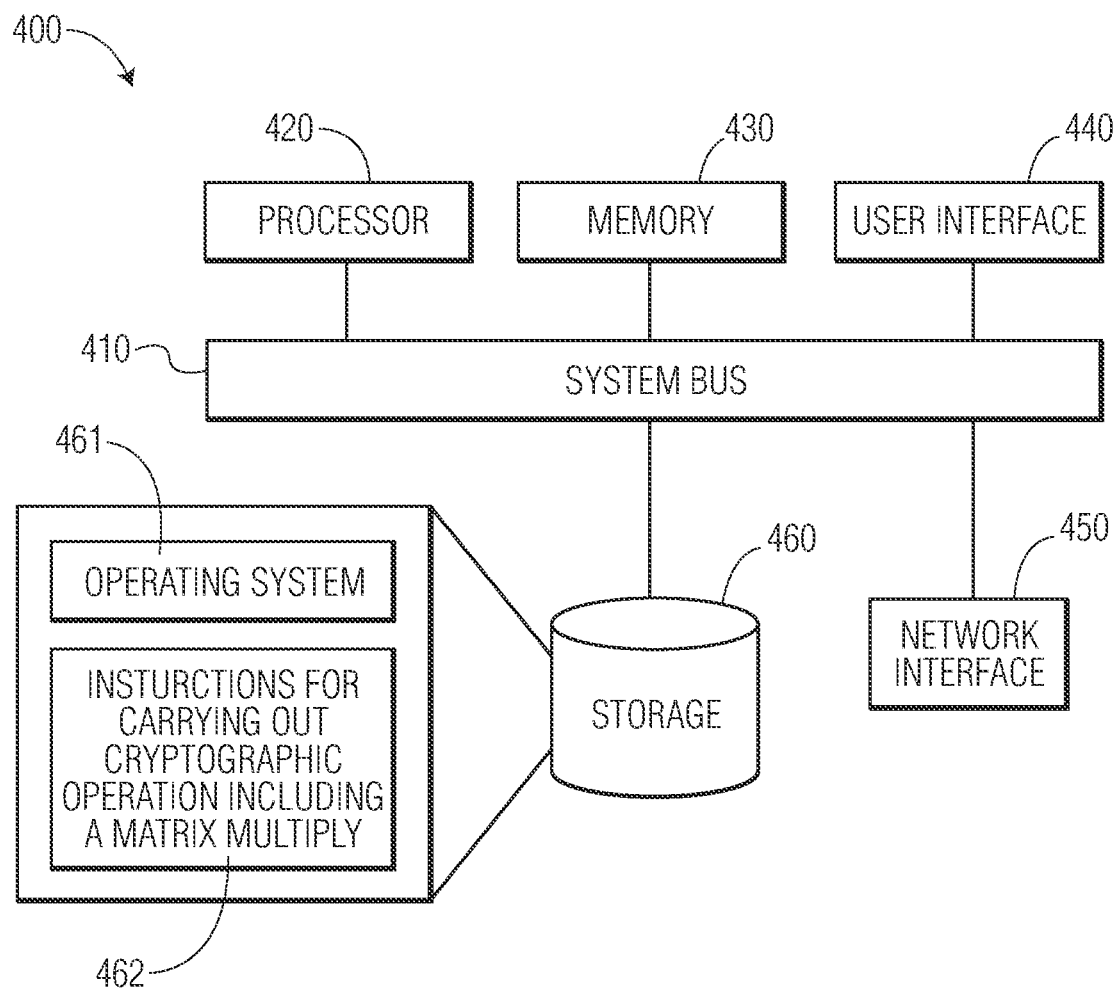
FIG. 4 illustrates an exemplary hardware diagram for implementing a cryptographic operation includes a matrix multiplication.

FIG. 4 illustrates an exemplary hardware diagram 400 for implementing a cryptographic operation including a matrix multiplication. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 430 may include various memories such as, for example L1, L2, or L3 cache or system memory. As such, the memory 430 may include static random-access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a touch interface, a mouse, and/or a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol or other communications protocols, including wireless protocols. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the hardware 400. Storage 462 may include instructions for carrying out the cryptographic function including a matrix multiply of FIGS. 1, 2, and 3.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

The system bus 410 allows communication between the processor 420, memory 430, user interface 440, storage 460, and network interface 450.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions for a cryptographic operation including matrix multiplication for lattice-based cryptography in a processor, the instructions, when executed, cause the processor to:

apply, by the processor, a first function to rows of a public matrix of polynomials to generate first outputs, wherein the first function excludes an identity function;

add, by the processor, an additional row to the public matrix of polynomials to produce a modified matrix, wherein each element in the additional row is generated by a second function applied to a column of the first outputs;

multiply, by the processor, the modified matrix with a vector of polynomials to produce an output vector of polynomials;

apply, by the processor, a verification function to the output vector that produces an indication of whether a fault occurred in the multiplication of the modified matrix with the vector of polynomials; and selectively perform, using the processor, a cryptographic operation using a private key to produce a signed output using the output vector when the verification function indicates that no fault occurred in the multiplication of the modified matrix with the vector of polynomials.

2. The data processing system of claim 1, wherein the additional row is calculated as:

$f_2(f_1(a_{0,i}), f_1(a_{1,i}), \ldots, f_1(a_{k-1,i}))$, where $f_1$ is the first function, $f_2$ is the second function, $a_{0,i}, a_{1,i}, \ldots, a_{k-1,i}$ are elements of an $i^{th}$ row of the public matrix of polynomials, and k is a number of rows of the matrix of polynomials.

3. The data processing system of claim 2, wherein $f_1(x)=c \cdot x$ for a constant secret c, the second function $f_2$ is a summation function, the verification function is defined as:

$$f_3(w_0, w_1, \ldots, w_k) = \begin{cases} \text{output a first logical value if } w_k - c\sum_{i=0}^{k-1} w_i \text{ equals zero,} \\ \text{output a second logical value otherwise.} \end{cases}$$

where $w_0, w_1, \ldots, w_k$ is the output vector of polynomials.

4. The data processing system of claim 3, wherein c is a power of 2.

5. The data processing system of claim 2, wherein $f_1(x)=c^{-1} \cdot x$ for a constant secret c and $c^{-1}$ is a modular inversion of c, the second function $f_2$ is a summation function, the verification function is defined as:

$$f_3(w_0, w_1, \ldots, w_k) = \begin{cases} \text{output a first logical value if } c^{-1}w_k - \sum_{i=0}^{k-1} w_i \text{ equals zero,} \\ \text{output a second logical value otherwise.} \end{cases}$$

where $w_0, w_1, \ldots, w_k$ is the output vector of polynomials.

6. The data processing system of claim 3, wherein $c^{-1}$ is a power of 2.

7. The data processing system of claim 2, wherein $f_1(x)=c \cdot x$ for a constant secret c selected randomly from values $2^i$ for $0 \leq i < 16$, the second function $f_2$ is a summation function, the verification function is defined as:

$$f_3(w_0, w_1, \ldots, w_k) = \begin{cases} \text{output a first logical value if } w_k - c\sum_{i=0}^{k-1} w_i \text{ equals zero,} \\ \text{output a second logical value otherwise.} \end{cases}$$

where $w_0, w_1, \ldots, w_k$ is the output vector of polynomials.

8. The data processing system of claim 2, wherein $f_1(x)=c_j \cdot x$ for a constant secret $c_j$ applied to each column of the public matrix of polynomials, the second function $f_2$ is a summation function, the verification function is defined as:

$$f_3(w_0, w_1, \ldots, w_k) = \begin{cases} \text{output a first logical value if } w_k - \sum_{i=0}^{k-1} c_i \cdot w_i \text{ equals zero,} \\ \text{output a second logical value otherwise.} \end{cases}$$

where $w_0, w_1, \ldots, w_k$ is the output vector of polynomials.

9. The data processing system of claim 8, wherein $c_j$ is a power of 2.

10. The data processing system of claim 1, further comprising:
randomly shuffling the rows of the public matrix of polynomials before multiplying the modified matrix with a vector of polynomials; and
relabeling the output vector of polynomials based upon the random shuffling.

11. The data processing system of claim 1, wherein before multiplying the modified matrix with the vector of polynomials, further comprising instructions that cause the processor to:
randomly shuffle columns of the modified matrix; and
shuffle the vector of polynomials using the same random shuffling for the columns.

12. A data processing system comprising instructions embodied in a non-transitory computer readable medium, the instructions for a cryptographic operation including matrix multiplication for lattice-based cryptography in a processor, the instructions, when executed, cause the processor to:
randomly shuffle one or more rows of a matrix of polynomials to produce a randomly shuffled matrix;
multiply the randomly shuffled matrix with a vector of polynomials to produce an output vector of polynomials;
relabel the output vector of polynomials based upon the random shuffling; and
perform a cryptographic operation using a private key and the relabeled output vector to produce a signed output; and
wherein the matrix of polynomials comprises one of a public matrix of polynomials or a modified matrix of polynomials.

13. The data processing system of claim 12, wherein:
before randomly shuffling the one or more rows of the matrix of polynomials, the instructions, when executed, further cause the processor to:
apply a first function to rows of the matrix of polynomials to generate first outputs;
add an additional row to the public matrix of polynomials to produce the modified matrix of polynomials, wherein each element in the additional row is generated by a second function applied to a column of the first outputs; and
after randomly shuffling the one or more rows of the matrix of polynomials, the instructions, when executed, further cause the processor to apply a verification function to the output vector to produce an indication of whether a fault occurred in the multiplication of the modified matrix with the vector of polynomials.

14. The data processing system of claim 13, wherein the additional row is calculated as:
$f_2(f_1(a_{0,i}), f_1(a_{1,i}), \ldots, f_1(a_{k-1,i}))$,
where $f_1$ is a first function, $f_2$ is a second function, $a_{0,i}$, $a_{1,i}, \ldots, a_{k-1},i$ are elements of an $i^{th}$ row of the matrix of polynomials, and k is the number of rows of the matrix of polynomials.

15. A data processing system comprising instructions embodied in a non-transitory computer readable medium, the instructions for a cryptographic operation including matrix multiplication for lattice-based cryptography in a processor, the instructions, when executed, cause the processor to:
randomly shuffle columns of a matrix of polynomials to produce a randomly shuffled matrix;
shuffle a vector of polynomials using the same random shuffling for the columns;
multiply the randomly shuffled matrix with the shuffled vector of polynomials to produce an output vector of polynomials; and
perform a cryptographic operation using a private key and the output vector of polynomials to produce a signed output; and
wherein the matrix of polynomials comprises one of a public matrix of polynomials or a modified matrix of polynomials.

16. The data processing system of claim 15, wherein:
before randomly shuffling the columns of the matrix of polynomials, the instructions, when executed, further cause the processor to:
apply a first function to the rows of the matrix of polynomials to generate first outputs;
add an additional row to the matrix of polynomials to produce the modified matrix of polynomials, wherein each element in the additional row is generated by a second function applied to a column of the first outputs; and
after randomly shuffling the columns of the matrix of polynomials, the instructions, when executed, further cause the processor to apply a verification function to the output vector that produces an indication of whether a fault occurred in the multiplication of the modified matrix of polynomials with the vector of polynomials.

17. The data processing system of claim 16, wherein the additional row is calculated as:
$f_2(f_1(a_{0,i}), f_1(a_{1,i}), \ldots, f_1(a_{k-1,i}))$,
where $f_1$ is a first function, $f_2$ is a second function, $a_{0,i}$, $a_{1,i}, \ldots, a_{k-1,i}$ are elements of an $i^{th}$ row of the matrix of polynomials, and k is the number of rows of the matrix of polynomials.

18. The data processing system of claim 16, wherein, when the fault occurred, the instructions further cause the processor to:
provide the indication that the fault occurred from the verification function; and
stop the cryptographic operation in response to the indication to prevent extraction of a private key.

* * * * *